E. Phelps.
Scraper.
Nº 11,028.   Patented Jun. 6, 1854.
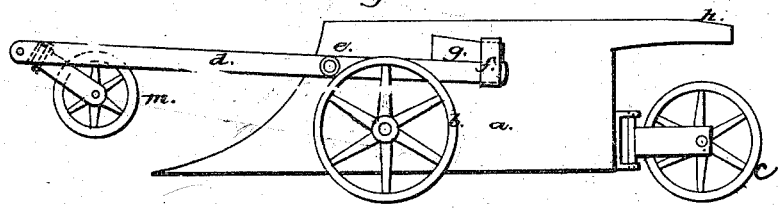
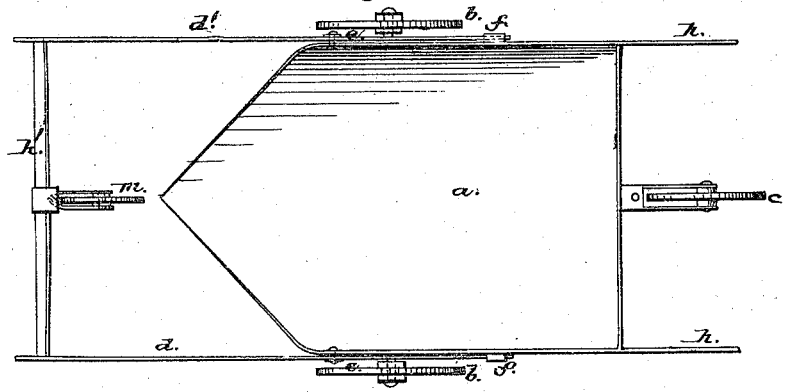

UNITED STATES PATENT OFFICE.

ELIJAH PHELPS, OF HENDERSONVILLE, ILLINOIS.

EXCAVATOR.

Specification of Letters Patent No. 11,028, dated June 6, 1854.

*To all whom it may concern:*

Be it known that I, ELIJAH PHELPS, of Hendersonville, in the county of Knox and State of Illinois, have invented a new and useful Improvement in Excavators; and I do hereby declare that the following is a full, clear, and exact description of the construction and operation of the same, reference being had to the annexed drawings, forming part of this specification, in which—

Figure 1 is a side elevation of the machine, and Fig. 2 a plan of the same.

Similar letters of reference in the several figures denote the same part of the machine.

The nature of my invention consists in combining with a scoop supported upon two wheels, two caster wheels, one in front and the other in rear of the scoop; the front caster wheel being attached to the draft bars, and so adjusted as will be hereafter set forth, as that the amount of cut into the earth may be regulated to the nature of the soil to be excavated.

In the drawing $a$ is the scoop supported upon the wheels $b$, the scoop being pointed as seen in Fig. 2, and armed on its edge with a steel cutter. In rear of the scoop is the caster wheel $c$, serving to support the rear of the scoop when filled and drawn forward. $d\ d'$ are the draft bars fastened to the scoop by the pins $e$ about which they are movable, their rear extremities fitting under straps $f$ and any desired position given to the draft bars by the wedges $g$ fitting under the strap and resting upon the draft bar. Upon the bar $h'$ connecting the bars $d\ d'$ is the caster wheel $m$ which by running upon the earth limits the cutting in of the edge of the scoop, which it is well known should vary with the different kinds of soil operated upon.

The operation of my improved excavator is as follows: The wedges $g$ are driven into the straps $f$ a sufficient distance to permit the draft bars $d\ d'$ when pressing against them, to give the caster wheel $m$ the requisite height above the front edge of the scoop, this distance between the levels of the edge of the scoop and the lowest point of the caster wheel $m$ being the depth of cut possessed by the machine, which cut must be varied to the species of soil operated upon. Having effected the above specified adjustment, the team is attached to the extremities of the draft bars $d\ d'$, and the machine driven forward, the operator holding the handles $h$ and raising the rear of the scoop. The cutting edge will enter the ground until checked by the pressure of the roller $m$ on the surface of the same; and as the machine moves forward a layer of earth of the gaged thickness will be received into the scoop. When sufficiently filled the rear of the scoop is allowed to drop back until the caster wheel $c$ rests upon the ground, when the load is driven off upon the three wheels $b$ and $c$ to the place of deposit, where the operator overturns the machine and the earth is thrown out.

The advantages of my improved excavator consist in its adjustability to the nature of the soil to be removed, and the simplicity and effectiveness of its operation, the former preventing too deep cutting and a consequent balking of the team, and the latter causing a rapidity of removal, unattainable by the usual methods of performing such operations.

I do not claim scoops supported by side wheels as such have been used before. But What I do claim as my invention and desire to secure by Letters Patent, is—

The combination of the wheeled scoop with the caster wheels $m$ and $c$ operating as and for the purposes herein fully set forth.

In testimony whereof, I have hereunto signed my name before two subscribing witnesses.

ELIJAH PHELPS.

Witnesses:
SAML. GRUBB,
JAS. M. MINOR.